(12) United States Patent
Sivagnanam et al.

(10) Patent No.: US 10,977,442 B2
(45) Date of Patent: *Apr. 13, 2021

(54) CONTEXTUALIZED CHAT BOT FRAMEWORK

(71) Applicant: SAP SE, Walldorf (DE)

(72) Inventors: Natesan Sivagnanam, Tamil Nadu (IN); Jayananda A. Kotri, Bangalore (IN)

(73) Assignee: SAP SE, Walldorf (DE)

( * ) Notice: Subject to any disclaimer, the term of this patent is extended or adjusted under 35 U.S.C. 154(b) by 119 days.

This patent is subject to a terminal disclaimer.

(21) Appl. No.: 16/219,890

(22) Filed: Dec. 13, 2018

(65) Prior Publication Data

US 2020/0192978 A1 Jun. 18, 2020

(51) Int. Cl.
| | | |
|---|---|---|
| *G06N 5/00* | (2006.01) | |
| *G06N 20/00* | (2019.01) | |
| *G06N 3/00* | (2006.01) | |
| *G06F 16/903* | (2019.01) | |
| *G06F 16/00* | (2019.01) | |
| *G06F 40/284* | (2020.01) | |
| *G06K 9/62* | (2006.01) | |
| *H04L 12/58* | (2006.01) | |
| *G06F 16/33* | (2019.01) | |

(52) U.S. Cl.
CPC ........ *G06F 40/284* (2020.01); *G06F 16/3334* (2019.01); *G06K 9/6215* (2013.01); *H04L 51/02* (2013.01)

(58) Field of Classification Search
CPC .... G06F 40/284; G06F 16/3334; G06F 40/30; G06K 9/6215; H04L 51/02; G06N 3/08
See application file for complete search history.

(56) References Cited

U.S. PATENT DOCUMENTS

| | | | |
|---|---|---|---|
| 10,219,122 B1* | 2/2019 | Scanlon | H04L 51/20 |
| 2009/0157408 A1* | 6/2009 | Kim | G10L 13/08 |
| | | | 704/260 |

(Continued)

*Primary Examiner* — Mohammad K Islam
(74) *Attorney, Agent, or Firm* — Mintz Levin Cohn Ferris Glovsky and Popeo, P.C.

(57) ABSTRACT

Methods and apparatus, including computer program products, are provided for a contextualized bot framework. In some implementations, there may be provided a method which may include receiving, by a bot of a contextualized bot network and via a client interface associated with the contextualized bot network, a request, the request comprising a text string sent by the client interface; generating, by the bot, a token based on the text string of the request; determining, by the bot, whether the token generated based on the text string of the request matches a stored token that is stored in a database, based on one or more parameters, the stored token being mapped to an address stored in the database, the address comprising instructions for responding to the request; selecting, by the bot, the address in response to the match between the token generated based on the text string of the request and the stored token to obtain data at the address; and presenting, by the bot, at the client interface, data obtained at the selected address to form a response to the request. Related systems, methods, and articles of manufacture are also disclosed.

19 Claims, 5 Drawing Sheets

(56) References Cited

U.S. PATENT DOCUMENTS

| | | | |
|---|---|---|---|
| 2015/0294377 A1* | 10/2015 | Chow | G06Q 30/0282 705/347 |
| 2016/0098386 A1* | 4/2016 | Rangarajan Sridhar | G06F 40/232 704/9 |
| 2017/0228367 A1* | 8/2017 | Pasupalak | G06F 40/20 |
| 2018/0068031 A1* | 3/2018 | Hewavitharana | G06F 40/295 |
| 2018/0137551 A1* | 5/2018 | Zheng | G06K 9/00442 |
| 2018/0276273 A1* | 9/2018 | Mittal | G06F 16/243 |
| 2018/0375947 A1* | 12/2018 | Hodges | H04L 67/10 |
| 2019/0042988 A1* | 2/2019 | Brown | G06Q 10/0631 |
| 2019/0102078 A1* | 4/2019 | Bhatt | G06F 3/04847 |
| 2019/0258967 A1* | 8/2019 | Gonzalez | G06Q 50/14 |
| 2020/0057946 A1* | 2/2020 | Singaraju | G06N 5/041 |

* cited by examiner

CONTEXTUALIZED CHAT BOT FRAMEWORK

FIELD

The subject matter described herein generally relates automated or autonomous software applications (or "bots") that run tasks or perform functions on a network, and more specifically to a contextualized bot framework.

BACKGROUND

The term "bot" refers to a software-based robot that performs at least one automated task. For example, a bot may be deployed to perform a simple task, while more complex bots, such as chatbots, can be deployed at a help desk or call center to simulate an actual human being responding to questions. Bots may take an unnecessarily long amount of time to perform tasks and respond to requests, as the bot searches across a library of responses to requests. In addition, bots may not have available all of the possible responses necessary to respond to requests. Thus, bots may be unable to respond to a request or may provide incorrect or inaccurate responses to requests if the requests do not exactly match one of the possible responses stored in the library of possible responses, such as when requests are misspelled, synonyms are used, and the like. Bots generally require customized implementations, so that deploying bots across a wide range of applications can require an unnecessarily large amount of integration and customization for each bot and corresponding application interacting with the bot.

SUMMARY

In some implementations, methods and apparatus, including computer program products, are provided for a contextualized bot framework that addresses the integration and customization required by current bots.

In some implementations, there may be provided a method which may include: receiving, by a bot of a contextualized bot network and via a client interface associated with the contextualized bot network, a request. The request may include a text string sent by the client interface. The method may also include generating, by the bot, a token based on the text string of the request. The method may further include determining, by the bot, whether the token generated based on the text string of the request matches a stored token that is stored in a database, based on one or more parameters. The stored token may be mapped to an address stored in the database. The address may include instructions for responding to the request. The method may also include selecting, by the bot, the address in response to the match between the token generated based on the text string of the request and the stored token to obtain data at the address. The method may further include presenting, by the bot, at the client interface, data obtained at the selected address to form a response to the request.

In some variations, one or more of the features disclosed herein including the following features can optionally be included in any feasible combination. The parameters may be associated with a user that submitted the request via the client interface. The method may further include in response to not having a match between the token and the stored token, determining, by the bot, whether at least one other token is a near match. The method may also include selecting, by the bot, the corresponding address for the at least one other token. The method may further include accessing, by the bot, corresponding data stored in the database at the corresponding address.

In some examples, the determining whether at least one other token is a near match includes calculating, by the bot, a distance metric associated with each other token of the at least one other token. The method may also include ranking, by the bot, the at least one other token based on the calculated distance metric.

In other examples, the calculating includes applying, by the bot, a weight to one or more of the parameters associated with the at least one other token.

In some examples, the method also includes comparing, by the bot, the distance metric associated with each token of the at least one other token to a threshold distance metric. The method may also include determining, by the bot, that the distance metric associated with a first token of the at least one other token is greater than or equal to the threshold distance metric. The first token may be mapped to a first address. The method may further include selecting, by the bot, the first address in response to determining that the distance metric associated with the first token is greater than or equal to the threshold distance metric. The method may also include presenting, by the bot, at the client interface, data obtained at the selected first address to form a response to the request.

In other examples, the method may include determining, by the bot, that the distance metric associated with a second token of the at least one other token is greater than or equal to the threshold distance metric, but lower than the distance metric associated with the first token. The method may also include in response to a negative response received via the client interface, indicating, by the bot, that the first token is not a match. The method may also include selecting, by the bot, a second address mapped to the second token. The method may further include presenting, at the client interface, data obtained at the selected second address to form an alternative to the request.

In some examples, the method may include learning, by the bot, the near match by adding the first token to a database of stored tokens mapped to addresses. The learning may be performed by a machine learning node coupled to the bot. The machine learning node may communicate with the database storing the stored tokens mapped to the addresses. The stored tokens may be obtained from prior requests to enable the learning.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

When practical, similar reference numbers denote similar structures, features, or elements.

DETAILED DESCRIPTION

This document describes a contextualized bot framework for improving integration and customization of bots, for easier and quicker deployment on a network. In some example implementations, there may be provided a contextualized bot framework that can be deployed across a variety applications. Moreover, the contextualized bot framework may include a machine learning implementation, such as an unsupervised machine learning implementation, and may enable integration with other bots. The machine learning implementation may be able to leverage contextual information about the interacting user to make intelligent decisions and provide accurate information and/or predictions in response to a user request. As noted below, the contextualized bot framework may make use of user-specific information and contextual information, such as the user's department, user's job profile, user's educational profile, user demographics, time of request, location request is made, etc.

Figure 1:
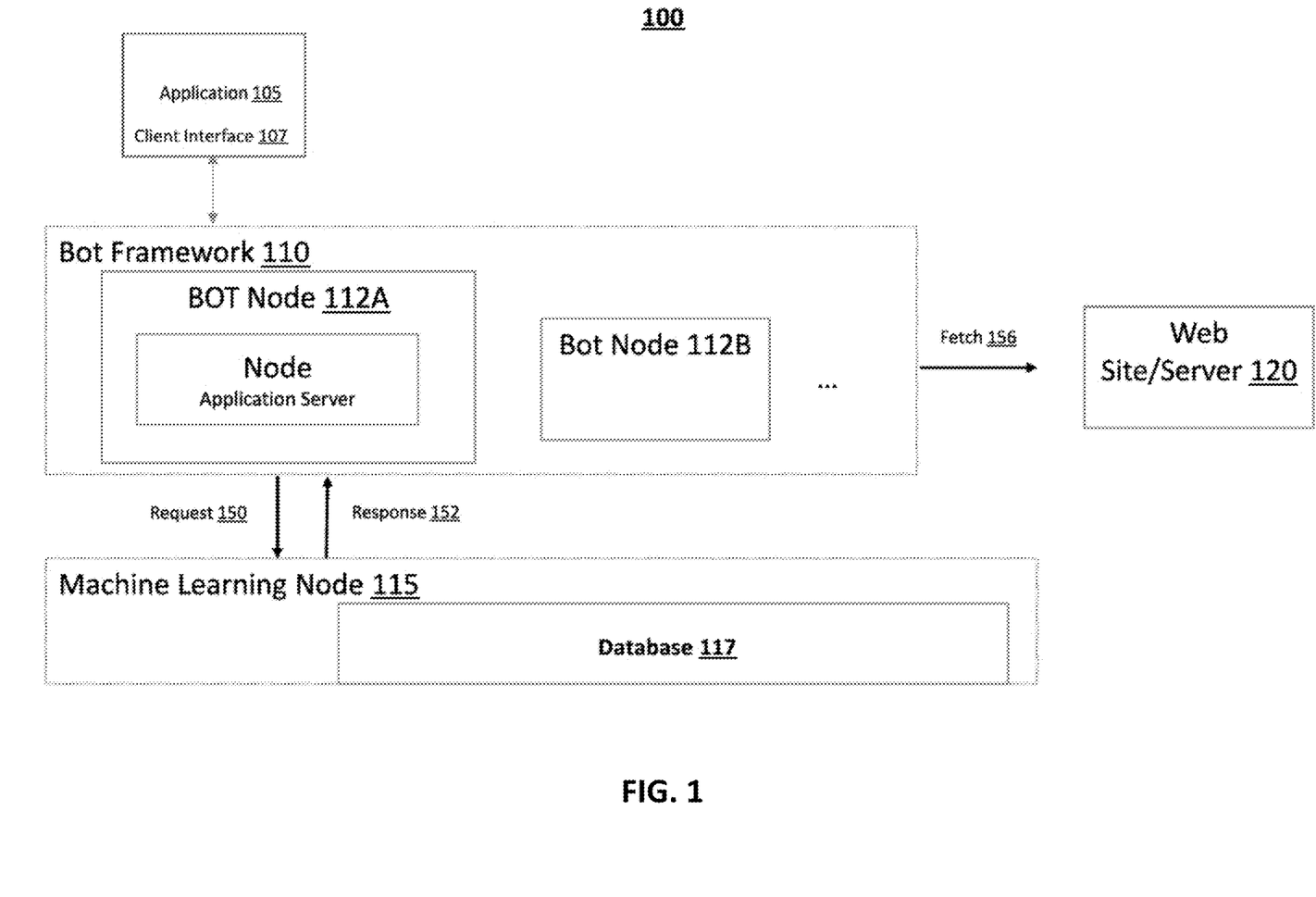
FIG. 1 illustrates an example of a bot framework, consistent with some example implementations.

FIG. 1 depicts an example of a system 100, in accordance with some example implementations. System 100 depicts an example implementation of the contextualized bot framework 110. This bot system 110 may include at least one bot node 112A, 112B, and so forth. The bot node, such as bot node 112A, may be implemented as an application server at a processor, such as a computer, and/or may be implemented as a service, such as a cloud service (accessible at a web-coupled computer via a network such as the Internet).

The bot node 112A may provide an interface at an application, such as an application 105. For example, the bot node 112A may be integrated into an application 105 via a client interface 107. The client interface 107 may provide text, chat, email, voice, mobile, and/or other types of interfaces between the application 105 and bot node 112A.

For example, the bot node 112A may provide at application 105 the client interface 107 as a chat interface over which a user of the application 105 may ask questions. To illustrate further, the user may type in a question asking "please list upcoming courses in Java," "request for leave," etc. When that question is entered in, the bot node 112A handles that request and returns the results as a response to the client interface 107 for presentation to the user of application 105. Because the bot node 112A is used, the results are returned without having an intermediate user providing the answer.

Although the previous example illustrates bot node 112A responding to a specific request, the bot node 112A may be configured to respond to a plurality of requests. Moreover, some of the responses to requests may be machine learned as noted further below. Furthermore, although a single application 105 is depicted, the bot nodes can be deployed across a variety of applications, so that the client interface can be accessed by the applications. Alternatively or additionally, different applications can access the bot nodes available in a centrally deployed location. For example, an enterprise system may include a plurality of applications, many of which may include a client interface such as client interface 107 provided by a bot node. Alternatively or additionally, an enterprise system may include a plurality of client applications accessed via various devices, which may access a centrally deployed bot node to service a request.

At 150, the bot node 112A may send the request to a machine learning node 115 in order to obtain a response to the request. For example, when the client interface 107 receives the request "please list upcoming courses in Java," "request for leave," etc., the bot node 105 may send, at 150, the request to machine learning node 115 for further processing.

In some implementations, the machine learning node 115 may include a database 117. The machine learning node may further include a tokenizer for generating tokens from a text string associated with a request, such as the request 150. The database 117 may store mappings between stored tokens and addresses (e.g., an application programming interface (API), a uniform resource locator (URL), an IP address, or other types of address), and may store a history of requests and responses. In some implementations, the database 117 may store the user's tasks or to do list, the user's profile (e.g., demographics, work profile, educational profile, skills, preferences), peer group interaction data, and peer jargon, and/or other parameters (e.g., user parameters). The database 117 may store the mappings between stored tokens and addresses across an entire enterprise. In some implementations, the database 117 additionally or alternatively includes a contextualized database (e.g., a filtered or narrowed database), which may store the mappings between stored tokens and addresses that are associated with a particular user and/or types of users. The contextualized database may help to narrow the search for a matching tokens performed by the machine learning node 115, thereby allowing for faster and more efficient searching.

The machine learning node 115, including the tokenizer, may take the phrase of the request received at 150 and generate at least one token for the request. The generated tokens may represent segments of the request. Returning to the previous request example of "please list upcoming courses in Java," the tokenizer at the machine learning node 115 may generate the following tokens: "list," "upcoming courses," and "Java." In the example of "leave request," the tokenizer at the machine learning node 115 may generate the following tokens: "leave."

Next, the machine learning node 115 may search for stored tokens that map to an address from which the answer can be obtained. Returning to the previous examples, the machine learning node 115 may have stored token(s) mapped to addresses, such as APIs and the like, from which an answer can be obtained. Here, the machine learning node 115 may search a database 117 for stored tokens that match the generated tokens "list," "upcoming courses," and "Java" (which are generated from the request at 150) or "leave" (which is generated from the request at 150). In some implementations, the machine learning node 115 may first search the contextualized database in the database 117 for tokens matching the generated tokens listed above. For example, the contextualized database may be a filtered or narrowed database that includes mappings between stored tokens and addresses related to the specific user or type of user making the request (e.g., users having a specific demographic, work profile, educational profile, skills, preferences, etc.). Accordingly, the machine learning node 115 may first search the filtered database for mappings between the stored tokens and addresses, thereby providing a quicker and/or more efficient search. In such implementations, if the mapping between the token and address is not found in the contextualized database, the machine learning node 115 may then search another contextualized database that is filtered using different parameters (e.g., user parameters), and/or search the remainder of the database 117, which captures the mappings between stored tokens and addresses across the entire enterprise containing various types of users.

If a match is found at the database 117, the stored tokens include a mapping to the address, such as an API from which the upcoming course catalog for Java can be obtained.

To illustrate further, the stored tokens in the first example may be as follows:

list, upcoming courses, and Java map to API X.

In this example, it is clear that generated tokens from the request match stored tokens in the database 117 exactly.

Suppose however, that the stored tokens at database 117 are as follows:

list, upcoming courses, and Java Virtual Machine map to API X; and
list, upcoming courses, and programming languages map to API Z.

In the second example, the stored tokens in the first example may be as follows:

leave maps to APIA.

In this example, it is clear that generated tokens from the request match stored tokens in the database 117 exactly.

Suppose however, that the stored tokens at database 117 are as follows:

time off maps to APIA.

In these examples, the generated tokens do not match the stored tokens. In some implementations, the machine learning node 115 may select at least one near match (e.g., by calculating a distance metric between the tokens associated with the request and the stored tokens at database 117). The distance metric (e.g., a metric, such as a percentage, representing a likelihood that the tokens associated with the request matches with the stored tokens in response to the user request and is the accurate response to the user request) may be determined by the machine learning node 115 based on an analysis of one or more parameters (e.g., user parameters), including user demographics and jargon (e.g., the age, language, location, etc. of the user or other users in the user's organization), the user's past preference, the user's technical knowledge, the user's skills and competency (e.g., processes used by various organizations in different time contexts, such as when employee reviews are provided), the user's work profile (e.g., geolocation and preferences, such as open for relocation, etc.), the user's peer group interaction information, the user's peer profile (e.g., the role of the user in peer groups, such as based on location, sub-organization, etc.), the user's usage data, the user's to do or overdue task lists, and/or the like. As noted below, the distance metric may be used to rank at least one potential near match. Calculating the distance metric based on the one or more user parameters may also lead to more accurate predictions and responses to user requests.

At least one of the near matches may be selected as a possible match and then proposed to the user as a possible match. For example, the machine learning model 115 may propose the alternative "list, upcoming courses, and Java Virtual Machine" to the user of the client interface 107. If the user accepts this near matching alternative, the machine learning node 115 may select the "API X" (which is mapped to list, upcoming courses, and Java Virtual Machine in this example). Moreover, the machine learning node 115 may learn this near matching alternative and add this near match to the stored tokens mapped to addresses contained at the database 117. When the machine learning node 115 adds the near match to the stored tokens mapped to addressed contained at the database 117, the machine learning node 115 may also store the associated one or more user parameters with the stored token.

At 152, the machine learning node 115 may return to the bot node 112A the address, such as the API "X", along with one or more parameters, such as "Java." Furthermore, the bot node 112A may then access (e.g., make a call, send a message, and/or the like) to the API "X" to fetch, at 156, the list of upcoming Java classes, for example. The machine learning node 115 may then present the results obtained from web site/server 120 in the client interface 107 of application 105.

Figure 2:
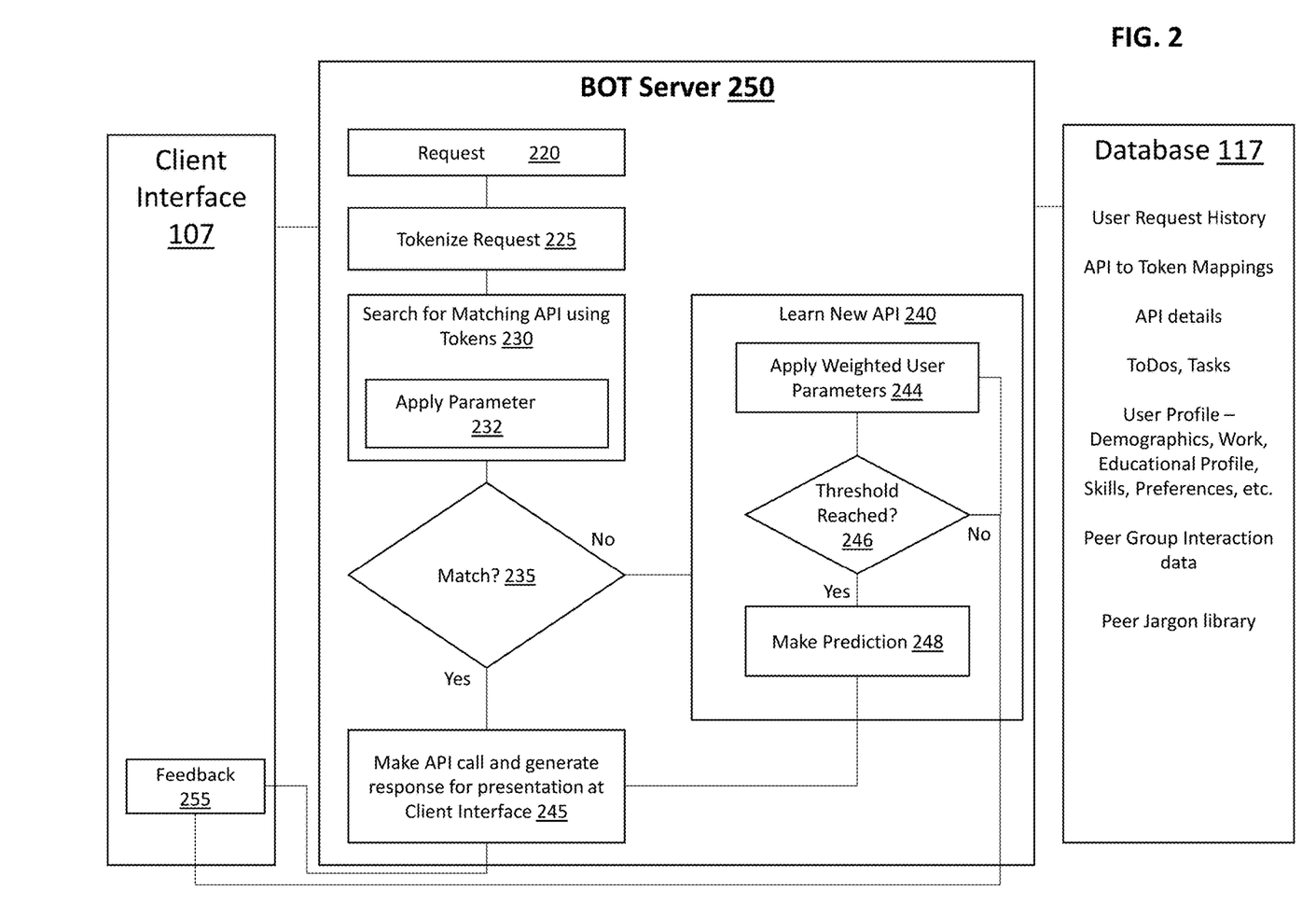
FIG. 2 illustrates an example of a process for a bot framework, consistent with some example implementations.

FIG. 2 depicts a process 200 of the contextualized bot framework, consistent with some implementations.

The bot's client interface 107 may provide an interface at which a user may type in a request, such as a question. For example, the bot client interface 107 may be implemented as part of the application 105 to provide a chat, a short message service, an email, or other text-based interface. Alternatively or additionally, a user may speak the question, in which case a speech-to-text converter may form the question. The client interface 107 may forward the request to the bot server 250.

The bot server 250 may be implemented as at least one processor and at least one memory including program code which when executed causes the bot server 250 disclosed herein to be provided. The bot server may include at least one bot node, such as bot nodes 112A, 112B, and so forth. The bot server may be implemented as a service, such as a cloud service accessible via the Internet.

At 220, the bot server 250 may receive, for handling by a bot, the request provided by the bot's client interface 107. This request may be received in the form of a message, such as a text message including a string of text.

Figure 3:
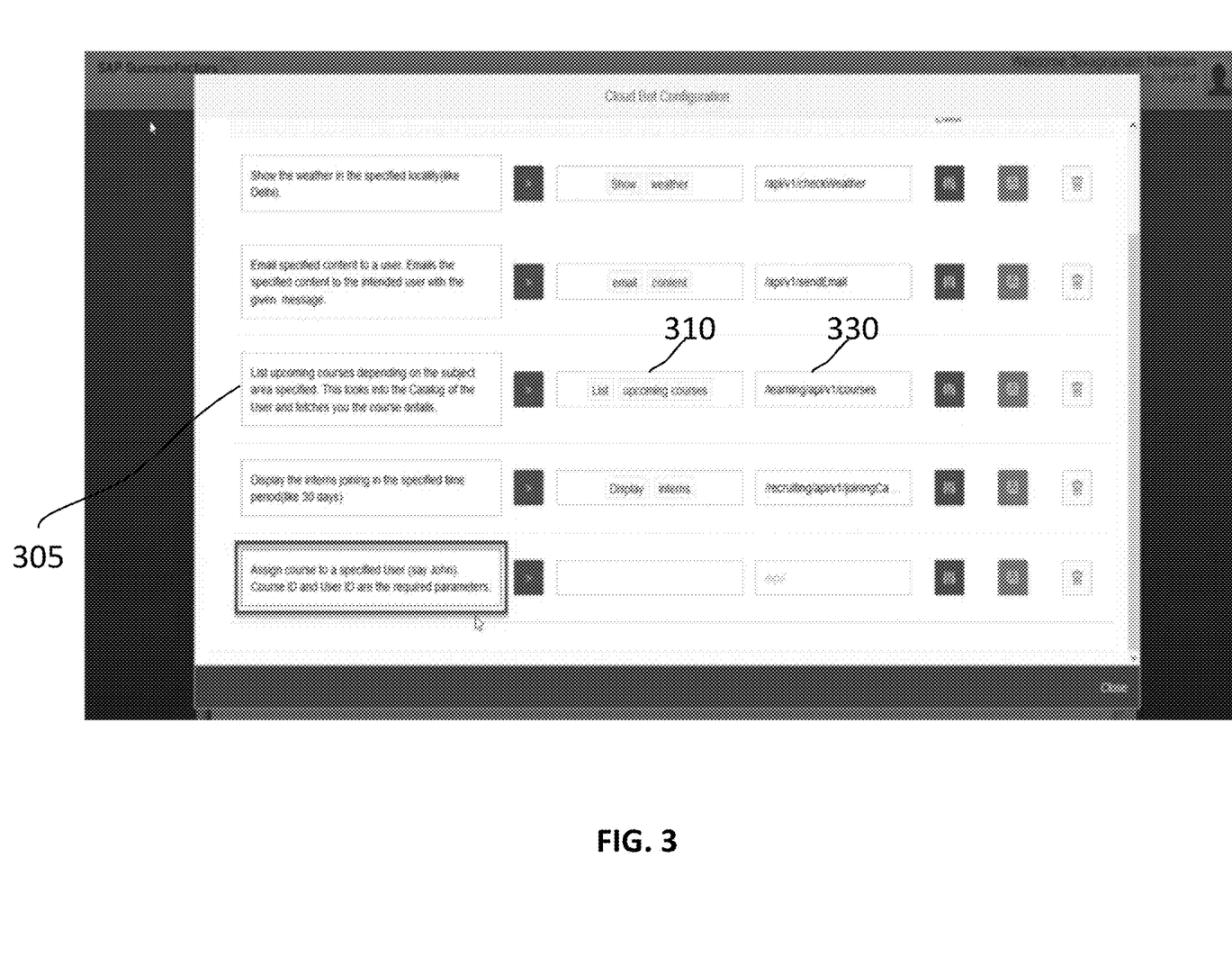
FIGS. 3-5 show examples of a tokenized request mapped to an address, consistent with some example implementations.
Figure 4:
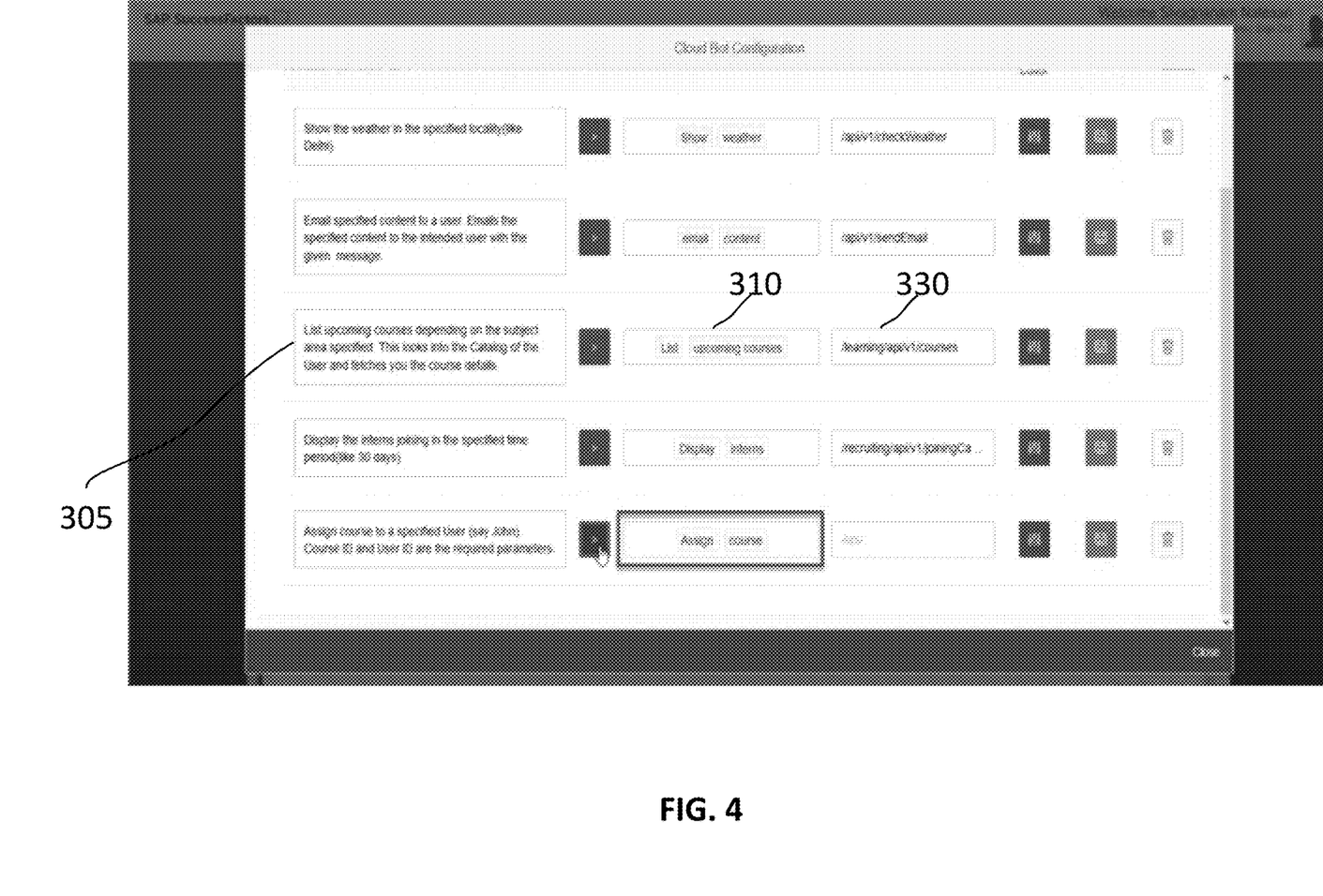

At 225, the bot server 250 may tokenize the request. The tokenization of the request may reduce the processing burden on the bot server with respect to finding a matching address, such as an API, when compared to using the entire request's string. Although the tokenization can be performed in a variety of ways, the tokenization may segment the string into text elements, such as one or more words while taking into account grammar, syntax and the user's sentiment. The tokenization may also include a filtering function that removes some of the less necessary tokens. FIGS. 3 and 4 depict the text string of the request 305 and the tokens 310 generated by the tokenizer. FIGS. 3 and 4 also depicts at 330 the API mapped to the tokens 310. The database 117 may store the tokens 310 that are mapped to API 330 as well as with other tokens mapped to APIs. The database 117 may also store the associated one or more user parameters with the stored token mapped to the API 330.

Referring again to FIG. 2, the bot server 250 may then search, at 230, for stored tokens at database 117 that match the tokenized request. In some implementations, the bot server 250 may apply one or more user parameters at 232 to search a contextualized database (e.g., a filtered or narrowed database) in the database 117 for tokens matching the tokenized request. The contextualized database may include a narrower search field than the overall database 117 storing the mappings between stored tokens and addresses across the entire enterprise. Accordingly, the bot server 250 may apply one or more user parameters at 232 to filter and search the contextualized database for mappings between the stored tokens and addresses, thereby providing a quicker and/or more efficient search. If the bot server 250 does not locate a mapping between the tokenized request and stored token in the contextualized database, the bot server 250 may then search another contextualized database or the remainder of the database 117, as mentioned above.

In an example, a request, made by a user who is a manager located in the United States, may be tokenized into "List" and "upcoming courses." The bot server 250 may then search database 117 for matching tokens. In some implementations, the bot server 250 first searches the contextualized database for matching tokens. The contextualized database of the database 117 may include matching tokens and addresses that may have been previously associated with the specific user making the request, or users matching or having a similar profile to the user making the request. For example, the contextualized database of the database 117 may include mappings associated with a user having the same role (e.g., manager) and/or a user located in the same region (e.g., United States). Of course, other user contexts may be implemented to create the contextualized database, such as users having a specific demographic, work profile, educational profile, skills, preferences, and the like. If the bot server 250 does not locate a matching token in the contextualized database, the bot server 250 may search the remainder of the database 117 for matching tokens.

Referring to the example of FIG. 3, the stored tokens 310 may include "List" and "upcoming courses," which may map to the API 330 (e.g., /learning/api/vl/courses). As such, the bot server 250 may be able to find an exact match at 310.

If an exact match is found between the tokens of the user request 220 and the stored tokens at database 117 (which are mapped to an address), then the bot server 250 (or machine learning node 115 therein) may select the address and access the address to obtain the data from the destination identified by the address (yes at 235 and 245). For example, the bot server 250 (which may include as node machine learning node 115) may search database 117 for stored tokens matching the token request "List" and "upcoming courses." As noted, if there is an exact match at 305/310, the bot server/machine learning node may select the API information 330, and then access the location identified by the API information 330 to obtain the list of upcoming courses, for example. The obtained data may then be presented at the bot's client interface 107 as an answer to the original user request received at 220, and the bot server 250 may receive user feedback at 255.

If an exact match is not found between the tokens of the request and the stored tokens at database 117, the bot server 250/machine learning node 115 may at 240 attempt to learn a response, such as an answer to the request, by proposing one or more alternatives from one or more near matching tokens stored at database 117 and making a call to an API mapped to the near matching tokens (no at 235, yes at 246). As noted above, if the tokens of the request are a near match to one or more of the stored tokens at database 117, the bot server 250/machine learning node 115 may select the address of the near matching stored token at database 117 and access the address at 245 to obtain the data from the destination identified by the address of the near matching token.

To determine whether a near match exists, the bot server 250 may apply one or more user parameters at 244 to potential near matches to obtain a ranking of the potential near matches. As mentioned above, the one or more user parameters may include one or more of including user demographics and jargon (e.g., the user's age, language, location), the user's past preference, the user's technical knowledge, the user's skills and competency, the user's work profile, the user's peer group interaction information, the user's peer profile, the user's usage data, the user's to do or overdue task lists, and the like.

The bot server 250 may apply one or more weights associated with each of the one or more user parameters 244 to calculate a distance metric for each potential near match, the distance metric being between the tokens associated with the request and the stored tokens at database 117. The distance metric may include a metric, such as a percentage, that represents a likelihood that the tokens associated with the request matches with the stored tokens in response to the user request. In other words, the distance metric represents the likelihood that the potential near match is the correct match in response to the user request. Calculating the distance metric based on the one or more user parameters may also lead to more accurate predictions and responses to user requests. Similarly using the distance metric to rank potential near matches by the associated distance metrics and/or comparing the distance metrics with a threshold may help to improve accuracy in the predictions made in response to the user request.

At 246, the bot server 250 may determine whether a threshold distance metric is met by the potential near matches. The threshold distance metric may be a percentage or a range of percentages. For example, the threshold distance metric may be 20%, 30%, 40%, 50%, 60%, 70%, 80% or greater or 30-70%, 20-50%, 50-70%, or greater, among other ranges and percentages, representing the likelihood that the potential near match is accurate. The bot server 250/machine learning node 115 may rank potential near matches based on the calculated distance metrics.

If no potential near matches are obtained (e.g., no potential near matches have a distance metric greater than or equal to the threshold distance metric), the bot server 250/machine learning node 115 may (i) adjust the weights applied to the one or more user parameters at 244 to determine a new potential near match or (ii) the bot server 250/machine learning node 115 may return an indication to the client interface 107 that the bot server 250 is not able to answer the request (no at 235, no at 246). If the bot server 250/machine learning node 115 returns an indication to the client interface 107 that the bot server 250 is not able to answer the request, the bot server 250 may ask the user to rephrase or clarify the request using one or more different terms or phrases to obtain feedback at 255.

If one potential near match is obtained (e.g., one potential near match has a distance metric greater than or equal to the threshold distance metric) after applying the one or more weighted user parameters at 244, the bot server 250/machine learning node 115 may make a prediction at 248 and may present, at client interface 107, a response including the obtained data and a query asking, for example, "Is this responsive to your original question or request?" If the user indicates yes at client interface 107 and the bot server 250/machine learning node 115 receives a positive indication of the match from the client interface 107 at 255, the bot server 250/machine learning node 115 may store a mapping from the request tokens to the stored tokens and address which were an acceptable near match. If the user indicates no at the client interface 107 and the bot server 250/machine learning node 115 receives a negative indication of the match from the client interface 107, the bot server 250/machine learning node 115 may (i) adjust the weights applied to the one or more user parameters at 244 to determine a new potential near match or (ii) the bot server 250/machine learning node 115 may return an indication to the client interface 107 that the bot server 250 is not able to answer the request (no at 235). If the bot server 250/machine learning node 115 returns an indication to the client interface 107 that the bot server 250 is not able to answer the request, the bot server 250 may ask the user to rephrase or clarify the request using one or more different terms or phrases.

In some implementations, if more than one (e.g., two, three, four, etc.) potential near matches are obtained (e.g., more than one potential near match has a distance metric greater than or equal to the threshold distance metric) after applying the one or more weighted user parameters at 244, the bot server 250/machine learning node 115 may further analyze the ranked potential near matches to determine which potential near match to present, at the client interface 107, to the user.

In some examples, if a first potential near match (that has a distance metric greater than or equal to the threshold) has a distance metric that is greater than the other potential near matches (e.g., second, third, fourth, etc. potential near matches that also have a distance metric greater than or equal to the threshold) by a certain amount (e.g., a predetermined amount), the bot server 250/machine learning node 115 may make a prediction at 248 and may present, at client interface 107, a response including the obtained data from the first potential near match and a query asking, for example, "Is this responsive to your original question or request?" If the user indicates yes at client interface 107 and the bot server 250/machine learning node 115 receives a positive indication of the match from the client interface 107, the bot server 250/machine learning node 115 may store a mapping from the request tokens to the stored tokens and address which were an acceptable near match. If the user indicates no at client interface 107, the bot server 250/ machine learning node 115 may select, from database 117, another alternative near matching token (e.g., the next second, third, and/or fourth, etc. near matches in the ranking) until no alternative near matching tokens remain, and propose the second, third, and/or fourth, etc. near matches to the user as noted above. If the user indicates no to all of the proposed options at the client interface 107 and the bot server 250/machine learning node 115 receives a negative indication of the match(es) from the client interface 107 and no alternative near matching tokens remain, the bot server 250/machine learning node 115 may (i) adjust the weights applied to the one or more user parameters at 244 to determine a new potential near match or (ii) the bot server 250/machine learning node 115 may return an indication to the client interface 107 that the bot server 250 is not able to answer the request.

If a first potential near match (that has a distance metric greater than or equal to the threshold) has a distance metric that is approximately equal to or within a range (e.g., predetermined range) of the distance metric of one or more other potential near matches (e.g., second, third, fourth, etc. potential near matches that also have a distance metric greater than or equal to the threshold), the bot server 250/machine learning node 115 may make a prediction at 248 and may present, at client interface 107, a response including the obtained data from the first, second, third, and/or fourth, etc. potential near matches and a query asking, for example, "Select the option that is responsive to your original question or request?" If the user selects a particular option at client interface 107 and the bot server 250/machine learning node 115 receives a positive indication of one of the first, second, third, fourth, etc. matches from the client interface 107, the bot server 250/machine learning node 115 may store a mapping from the request tokens to the stored tokens and address which were an acceptable near match. If the user indicates no at client interface 107, the bot server 250/machine learning node 115 may select, from database 117, one or more alternative near matching tokens until no alternative near matching tokens remain. If the user indicates no to all of the proposed options at the client interface 107 and the bot server 250/machine learning node 115 receives a negative indication of the match from the client interface 107, and no alternative near matching tokens remain, the bot server 250/machine learning node 115 may (i) adjust the weights applied to the one or more user parameters at 244 to determine a new potential near match or (ii) the bot server 250/machine learning node 115 may return an indication to the client interface 107 that the bot server 250 is not able to answer the request.

Figure 5:
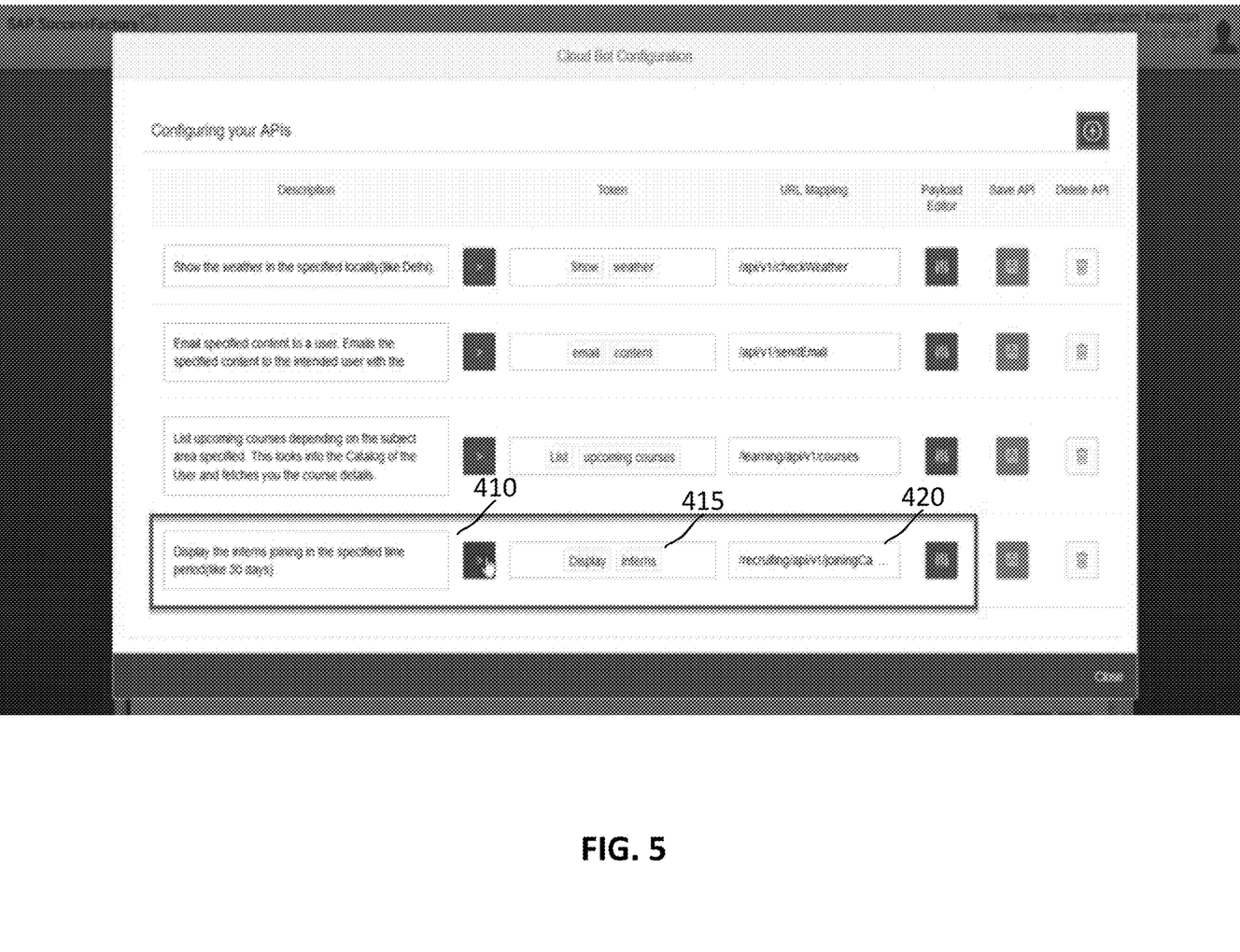

FIG. 5 depicts at 410 another request in the form of a text string that has been tokenized at 415 and mapped to an address 420. The token 415 and the address 420 may be stored at database 117 and searched in order to find matching tokens as noted above. The tokens may include other aspects as well include sentiment (e.g., whether the text string relates to anger, joy, excitement, confusion, and/or the like), language (e.g., what language the text string is in), and one or more user parameters associated with each user request.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer-implemented method, comprising:
   receiving, by a bot of a contextualized bot network and via a client interface associated with the contextualized bot network, a request, the request comprising a text string sent by the client interface;
   generating, by the bot, a token based on the text string of the request;
   determining, by the bot, whether the token generated based on the text string of the request matches a stored token that is stored in a database, based on one or more parameters, the stored token being mapped to an address stored in the database, the address comprising instructions for responding to the request, and the one or more parameters being associated with a type of user interacting with the client interface;
   selecting, by the bot, the address in response to the match between the token generated based on the text string of the request and the stored token to obtain data at the address; and
   presenting, by the bot, at the client interface, data obtained at the selected address to form a response to the request.

2. The method of claim 1, further comprising:
   in response to not having a match between the token and the stored token, determining, by the bot, whether at least one other token is a near match;
   selecting, by the bot, the corresponding address for the at least one other token; and accessing, by the bot, corresponding data stored in the database at the corresponding address.

3. The method of claim 2, wherein the determining whether at least one other token is a near match comprises:
   calculating, by the bot, a distance metric associated with each other token of the at least one other token; and
   ranking, by the bot, the at least one other token based on the calculated distance metric.

4. The method of claim 3, wherein the calculating comprises applying, by the bot, a weight to one or more of the parameters associated with the at least one other token.

5. The method of claim 3, further comprising:
   comparing, by the bot, the distance metric associated with each token of the at least one other token to a threshold distance metric;
   determining, by the bot, that the distance metric associated with a first token of the at least one other token is greater than or equal to the threshold distance metric, the first token mapped to a first address;
   selecting, by the bot, the first address in response to determining that the distance metric associated with the first token is greater than or equal to the threshold distance metric; and
   presenting, by the bot, at the client interface, data obtained at the selected first address to form a response to the request.

6. The method of claim 5, further comprising:
   determining, by the bot, that the distance metric associated with a second token of the at least one other token is greater than or equal to the threshold distance metric, but lower than the distance metric associated with the first token; and
   in response to a negative response received via the client interface, indicating, by the bot, that the first token is not a match, selecting, by the bot, a second address mapped to the second token; and presenting, at the client interface, data obtained at the selected second address to form an alternative to the request.

7. A system, comprising:
   at least one data processor; and
   at least one memory storing instructions which, when executed by the at least one data processor, cause operations comprising:
      receiving, by a bot of a contextualized bot network and via a client interface associated with the contextualized bot network, a request, the request comprising a text string sent by the client interface;
      generating, by the bot, a token based on the text string of the request;
      determining, by the bot, whether the token generated based on the text string of the request matches a stored token that is stored in a database, based on one or more parameters, the stored token being mapped to an address stored in the database, the address comprising instructions for responding to the request, and the one or more parameters being associated with a type of user interacting with the client interface;
      selecting, by the bot, the address in response to the match between the token generated based on the text string of the request and the stored token to obtain data at the address; and
      presenting, by the bot, at the client interface, data obtained at the selected address to form a response to the request.

8. The system of claim 7, wherein the operations further comprise:
in response to not having a match between the token and the stored token, determining, by the bot, whether at least one other token is a near match;
selecting, by the bot, the corresponding address for the at least one other token; and accessing, by the bot, corresponding data stored in the database at the corresponding address.

9. The system of claim 8, wherein the determining whether at least one other token is a near match comprises:
calculating, by the bot, a distance metric associated with each other token of the at least one other token; and
ranking, by the bot, the at least one other token based on the calculated distance metric.

10. The system of claim 9, wherein the calculating comprises applying, by the bot, a weight to one or more of the parameters associated with the at least one other token.

11. The system of claim 9, wherein the operations further comprise:
comparing, by the bot, the distance metric associated with each token of the at least one other token to a threshold distance metric;
determining, by the bot, that the distance metric associated with a first token of the at least one other token is greater than or equal to the threshold distance metric, the first token mapped to a first address;
selecting, by the bot, the first address in response to determining that the distance metric associated with the first token is greater than or equal to the threshold distance metric; and
presenting, by the bot, at the client interface, data obtained at the selected first address to form a response to the request.

12. The system of claim 11, wherein the operations further comprise:
determining, by the bot, that the distance metric associated with a second token of the at least one other token is greater than or equal to the threshold distance metric, but lower than the distance metric associated with the first token; and
in response to a negative response received via the client interface, indicating, by the bot, that the first token is not a match, selecting, by the bot, a second address mapped to the second token; and presenting, at the client interface, data obtained at the selected second address to form an alternative to the request.

13. A non-transitory computer-readable medium storing instructions, which when executed by at least one data processor, result in operations comprising:
receiving, by a bot of a contextualized bot network and via a client interface associated with the contextualized bot network, a request, the request comprising a text string sent by the client interface;
generating, by the bot, a token based on the text string of the request;
determining, by the bot, whether the token generated based on the text string of the request matches a stored token that is stored in a database, based on one or more parameters, the stored token being mapped to an address stored in the database, the address comprising instructions for responding to the request, and the one or more parameters being associated with a type of user interacting with the client interface;
selecting, by the bot, the address in response to the match between the token generated based on the text string of the request and the stored token to obtain data at the address; and
presenting, by the bot, at the client interface, data obtained at the selected address to form a response to the request.

14. The non-transitory computer-readable medium of claim 13, wherein the operations further comprise:
in response to not having a match between the token and the stored token, determining, by the bot, whether at least one other token is a near match;
selecting, by the bot, the corresponding address for the at least one other token; and accessing, by the bot, corresponding data stored in the database at the corresponding address.

15. The non-transitory computer-readable medium of claim 14, wherein the determining whether at least one other token is a near match comprises:
calculating, by the bot, a distance metric associated with each other token of the at least one other token; and
ranking, by the bot, the at least one other token based on the calculated distance metric.

16. The non-transitory computer-readable medium of claim 15, wherein the calculating comprises applying, by the bot, a weight to one or more of the parameters associated with the at least one other token.

17. The non-transitory computer-readable medium of claim 15, wherein the operations further comprise:
comparing, by the bot, the distance metric associated with each token of the at least one other token to a threshold distance metric;
determining, by the bot, that the distance metric associated with a first token of the at least one other token is greater than or equal to the threshold distance metric, the first token mapped to a first address;
selecting, by the bot, the first address in response to determining that the distance metric associated with the first token is greater than or equal to the threshold distance metric; and
presenting, by the bot, at the client interface, data obtained at the selected first address to form a response to the request.

18. The method of claim 1, wherein the type of user comprises a user having one or more of a selected demographic, a selected work profile, a selected educational profile, a selected skill, and a selected preference.

19. The method of claim 18, wherein the determining whether the generated token matches the stored token further comprises: searching, at a filtered database of the database, the filtered database filtered based on the type of user.

* * * * *